United States Patent [19]
Tsuji

[11] Patent Number: 6,059,095
[45] Date of Patent: May 9, 2000

[54] CONVEYING ROLLER AND A METHOD FOR PRODUCING THE SAME

[75] Inventor: Hideki Tsuji, Wakayama, Japan

[73] Assignee: Noritsu Koki Co., Ltd., Wakayama-ken, Japan

[21] Appl. No.: 09/021,883

[22] Filed: Feb. 11, 1998

[30] Foreign Application Priority Data

Feb. 14, 1997 [JP] Japan .................................. 9-030276

[51] Int. Cl.⁷ .................................................. B29C 43/46
[52] U.S. Cl. ...................... 198/780; 193/37; 193/35 F; 492/38; 492/39; 492/56
[58] Field of Search .............................. 198/980; 193/37, 193/35 F; 492/38–39, 49, 51–53, 56

[56] References Cited

U.S. PATENT DOCUMENTS 4,312,444  1/1982  Mushovic .
5,433,691  7/1995  Hiraoka ...................................... 492/56
5,744,238  4/1998  Limperia et al. .......................... 492/56

FOREIGN PATENT DOCUMENTS 1405679  9/1975  Germany .

*Primary Examiner*—Christopher P. Ellis
*Assistant Examiner*—Mark A. Deuble
*Attorney, Agent, or Firm*—Jordan and Hamburg LLP

[57] ABSTRACT

A conveying roller includes a shaft and a body member placed on a periphery of the shaft. The body member is provided with an inner layer placed on the periphery of the shaft and an outer layer placed on a periphery of the inner layer. The inner layer is made of a thermoplastic resin having a predetermined volume reduction rate. The outer layer is made of an elastomer. The conveying roller has an increased adhesion between the shaft and the body member.

22 Claims, 4 Drawing Sheets

CONVEYING ROLLER AND A METHOD FOR PRODUCING THE SAME

BACKGROUND OF THE INVENTION

This invention relates to a conveying roller having an elastomer member disposed on the periphery of a shaft in a uniform thickness in the radial direction, and a method for producing the same.

Hitherto has been known a conveying roller including an elastomer member placed on the periphery of a metal shaft in a uniform thickness in the radial direction. Such a conveying roller having a body member made of elastomer is advantageous in transferring paper in a copying machine, facsimile machine, printing machine, or the like because of flexibility of the elastomer member.

Such conveying rollers have been generally produced by the so-called shaft press-in-fitting method where a shaft coated with an adhesive on the periphery is pressingly inserted in a center hole of a cylindrically formed elastomer body member, or the so-called elastomer winding method where an elastomer material is wound on a shaft coated with an adhesive on the periphery.

The body member always comes into contact with paper or other object, and often comes into contact with chemical material such as developing solution. Accordingly, the body member requires material having high wear resistance and chemical resistance.

In the shaft press-in-fitting method, a cylindrical body member is formed by extrusion molding. The cylindrical body member is formed with a center hole. A shaft is coated with an adhesive, and then is pressed into the center hole of the body member. This method requires skillful and delicate operations. Accordingly, this method is low in the production efficiency while high in the production costs. The same problems are found in the elastomer winding method.

To solve these problems, the so-called injection molding method has been proposed. In the injection molding method, a conveying roller is produced by placing a shaft in a die, and injecting a molten elastomer into a mold space in the die.

As mentioned above, the material for a body member of a conveying roller requires high wear and chemical resistances. However, elastomer having high wear resistance and chemical resistance exhibits a low adhesion. Accordingly, there is a problem that when a conveying roller produced by the injection molding method is placed in operation, the shaft and the elastomer body member slide over each other, impairing the integral rotation of the shaft and the body member.

To increase the adhesion between the shaft and the body member in the injection molding method, there has been proposed addition of a step of applying an adhesive onto a periphery of a shaft placed in a molding die before a molten elastomer is injected into the die. However, this addition makes the production process complicated, and decreases the productivity of conveying roller production.

SUMMARY OF THE INVENTION

It is an object of the present invention to provide a conveying roller and a method for producing a conveying roller which overcome the problems residing in the prior art.

According to an aspect of the present invention, a conveying roller comprises a shaft and a body member placed on a periphery of the shaft. The body member includes an inner layer placed on the periphery of the shaft and an outer layer placed on a periphery of the inner layer. The inner layer is made of a thermoplastic resin having a predetermined volume reduction rate. The outer layer is made of an elastomer.

According to another aspect of the present invention, a method for producing a conveying roller comprises the steps of placing a shaft in a first die having a first mold space, injecting a molten thermoplastic resin having a predetermined volume reduction rate into the first mold space to place the molten thermoplastic resin around a periphery of the shaft, cooling the first die to produce a preliminary molded product having an inner layer of thermoplastic resin on the periphery of the shaft, placing the preliminary molded product in a second die having a second mold space, injecting a molten elastomer into the second mold space to place the molten elastomer around a periphery of the inner layer of the preliminary molded product, and cooling the second die to produce a conveying roller having an outer layer of elastomer on the periphery of the inner layer.

These and other objects, features and advantages of the invention will become more apparent upon reading the following detailed description in conjunction with the accompanying drawings.

DETAILED DESCRIPTION OF PREFERRED EMBODIMENTS OF THE INVENTION

Figure 1:
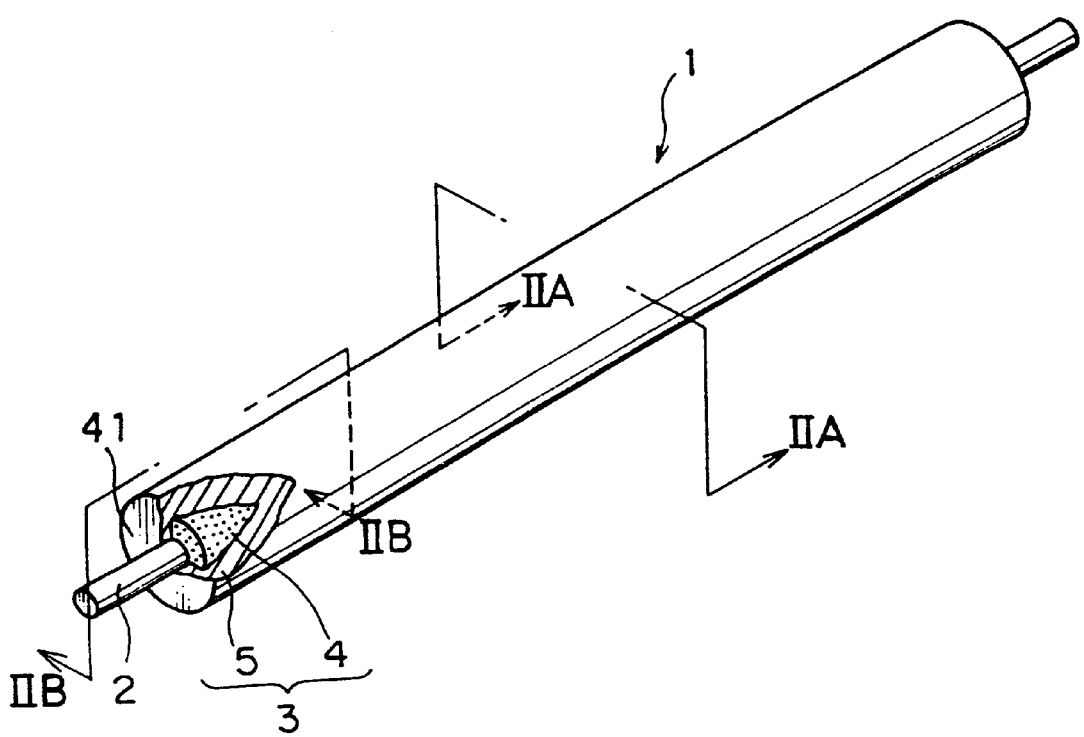
FIG. 1 is a partially cut away perspective view showing a conveying roller embodying the invention.
Figure 2A:
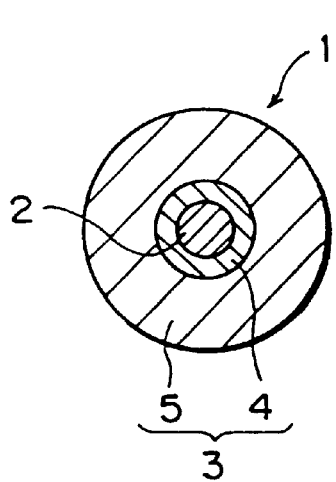
FIG. 2A is a sectional view taken along the line IIA—IIA in FIG. 1.
Figure 2B:
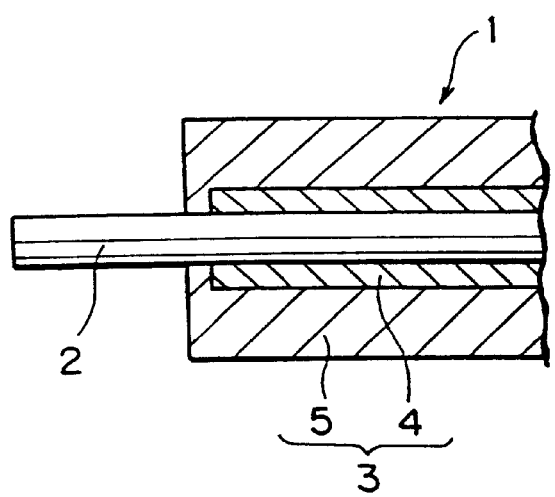
FIG. 2B is a sectional view taken along the line IIB—IIB in FIG. 1.

A conveying roller embodying the present invention will be described with reference to FIGS. 1 to 2B. Indicated at 1 is a conveying roller which comprises a metal cylindrical shaft 2, and a body member 3 on the periphery of the shaft 2.

The body member 3 includes an inner layer 4 placed on the periphery of the shaft 2, and an outer layer 5 placed on the periphery of the inner layer 4. Both ends of the inner layer 4 are covered with an end cover 41 formed by the outer layer 5. The ends of the inner layer 4 are not exposed to the outside.

The shaft 2 is made of a stainless steel and is in the form of a cylinder having no slit or groove in the surface.

The inner layer 4 is made of a thermoplastic resin, such as polypropylene resin. The resin has a volume reduction rate from the molten state to the solid state, or shrinkage factor, in a range of 0.5% to 2.0%. In the case of using a thermoplastic resin having a volume reduction rate of 0.5% or more, the molten resin on the periphery of the shaft 2 solidifies in a process of cooling, thus tightly adhering on the shaft 2. Accordingly, the shaft 2 is firmly prevented from shifting with respect to the body member.

In the case of using a thermoplastic resin having a volume reduction rate of lower than 0.5%, the tightening effect on the shaft 2 is not sufficient. Accordingly, there is a likelihood that the shaft 2 slides out of the body member 3 when axial forces are oppositely applied to the shaft 2 and the body member 3. Also, there is a likelihood that the shaft 2 and the body member 3 will slide over each other in circumferential directions when the weight or load of an article to be conveyed is great.

On the other hand, in the case of using a thermoplastic resin having a volume reduction rate of larger than 2.0%, an excessive internal stress is liable to occur in the inner layer 4, resulting in a short life.

The outer layer 5 is made of a thermoplastic elastomer having a melting temperature (molding temperature) nearly identical to that of the thermoplastic resin of the inner layer 4. The use of such elastomer has the following advantageous effect. In a process of molding, the molten elastomer can be placed on the periphery of the inner layer 4 whose surface portion is partially melted by the heat of the molten elastomer. Accordingly, the resin of the inner layer 4 and the elastomer are partially mixed, and the inner layer 4 and outer layer 5 are securely integrated in the boundary zone.

In this embodiment, more specifically, the outer layer 5 is made of olefin elastomer having a melting temperature identical to the melting point (165° C.) of the polypropylene resin of the inner layer 4.

With the construction of the conveying roller 1, the inner layer 4 is tightly adhered on the periphery of the shaft 2 because of the shrinkage of the thermoplastic resin, and the outer layer 5 is integrated with the inner layer 4. Accordingly, the body member 3 including the inner and outer layers 4 and 5 is firmly bonded on the shaft 2, thus securely preventing the shaft 2 from shifting in the body member 3. An article to be conveyed, such as print paper, can be flexibly and securely conveyed by the outer layer made of elastomer.

The inner layer 4 is pressingly adhered onto the periphery of the shaft 2 because of the shrinkage, resulting in no clearance between the shaft 2 and the inner layer 4. Also, the polypropylene, which the inner layer 4 is made of, is resistant to chemicals. Accordingly, even in the case where the conveying roller 1 is immersed in a chemical solution such as developing solution, the chemical solution will not enter and stay between the periphery of the shaft 2 and the inner surface of the inner layer 4. Corrosion of the conveying roller 1 due to chemical solution is thus suppressed.

FIGS. 3A through 3F respectively show first to sixth shaft modifications of the conveying roller.

Figure 3A:
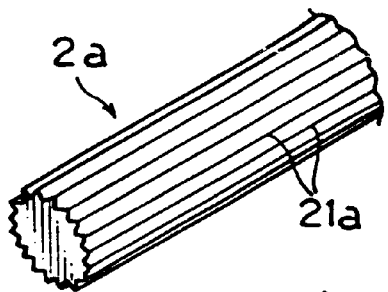
FIG. 3A is a perspective view showing a part of a first modified shaft.

A shaft 2a in the first modification shown in FIG. 3A has a plurality of ridges 21a extending in an axial direction in a periphery thereof. The plurality of ridges 21a are spaced in a circumferential direction at an equal interval. The adhesion of an inner layer 4 onto the periphery of the shaft 2a is enhanced because the inner layer 4 occupies spaces between the ridges 21a. The body member 3 thus rotates securely together with the shaft 2a.

Figure 3B:
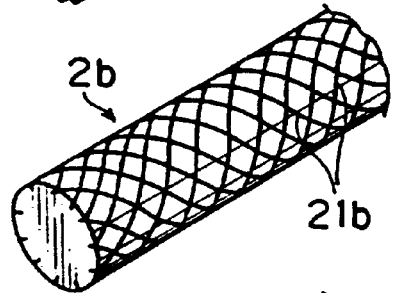
FIG. 3B is a perspective view showing a part of a second modified shaft.

A shaft 2b in the second modification shown in FIG. 3B has a plurality of intersecting grooves 21b in a periphery thereof. The adhesion of an inner layer 4 onto the periphery of the shaft 2b is enhanced because the inner layer 4 occupies the intersecting grooves 21b. The body member 3 thus rotates securely together with the shaft 2b.

Figure 3C:
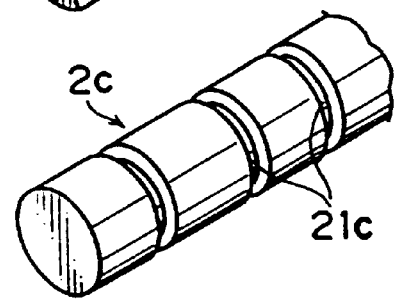
FIG. 3C is a perspective view showing a part of a third modified shaft.

A shaft 2c in the third modification shown in FIG. 3C has a plurality of annular grooves 21c in a periphery thereof. The plurality of annular grooves 21c are arranged in an axial direction of the shaft 2c at specified intervals. The adhesion of an inner layer 4 onto the periphery of the shaft 2c is enhanced because the inner layer 4 occupies the annular grooves 21c. The body member 3 thus rotates securely together with the shaft 2c.

Figure 3D:
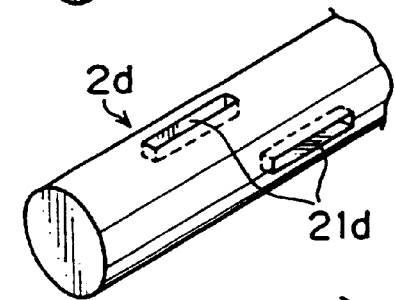
FIG. 3D is a perspective view showing a part of a fourth modified shaft.

A shaft 2d in the fourth modification shown in FIG. 3D has a plurality of rectangular holes 21d in a periphery thereof. The plurality of rectangular holes 21d are arranged in the periphery at specified intervals in axial and circumferential directions. The adhesion of an inner layer 4 onto the periphery of the shaft 2d is enhanced because the inner layer 4 occupies the rectangular holes 21d. The body member 3 thus rotates securely together with the shaft 2d.

Figure 3E:
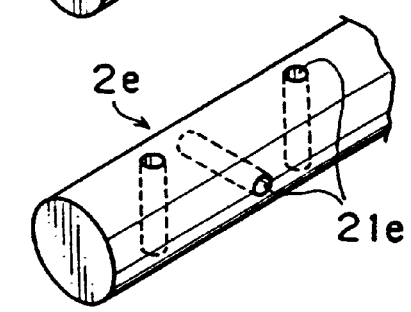
FIG. 3E is a perspective view showing a part of a fifth modified shaft.

A shaft 2e in the fifth modification shown in FIG. 3E has a plurality of through holes 21e extending in radial directions. The plurality of through holes 21e are arranged at specified intervals in an axial direction. The adhesion of an inner layer 4 onto the periphery of the shaft 2e is enhanced because the inner layer 4 occupies the through holes 21e. The body member 3 thus rotates securely together with the shaft 2e.

Figure 3F:
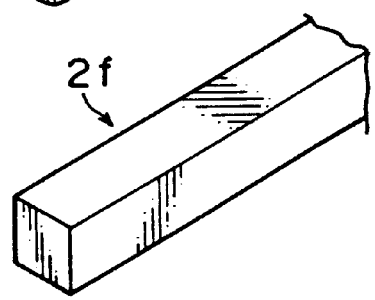
FIG. 3F is a perspective view showing a part of a sixth modified shaft.

A shaft 2f in the sixth modification shown in FIG. 3F has an intermediate portion whose cross section is square. An inner surface of an inner layer 4 is made to contact with the intermediate portion having the square cross section. Accordingly, the adhesion of the inner layer 4 onto the periphery of the shaft 2f increases, thus permitting the body member 3 to rotate securely together with the shaft 2f.

FIGS. 4A to 5B are diagrams illustrating a production of a conveying roller of the invention.

Figure 4A:
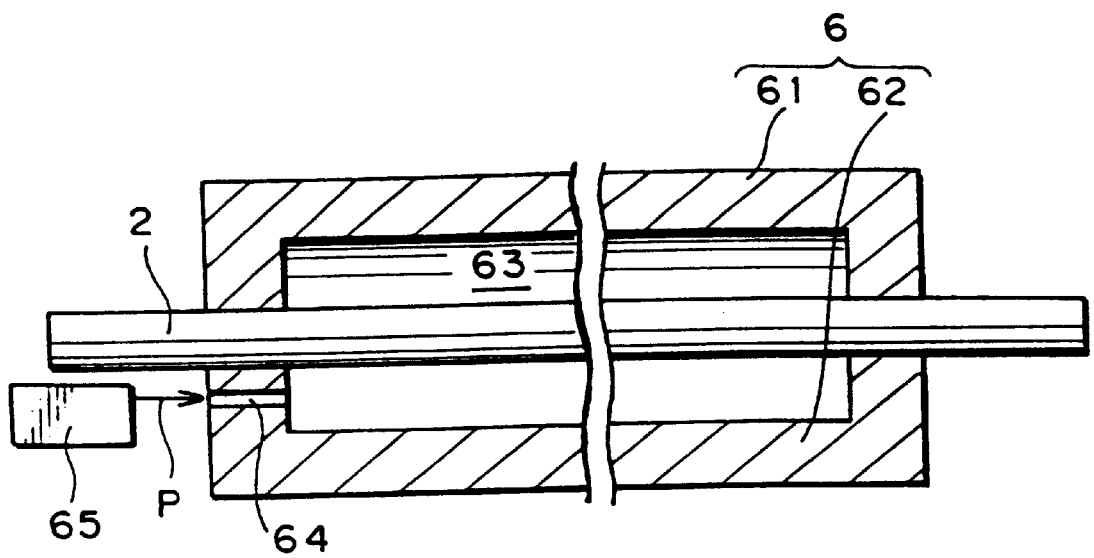
FIGS. 4A and 4B are diagrams showing a first step of a producing method embodying the invention, FIG. 4A showing a state where a molten resin is injected into a first die mounted with a shaft, FIG. 4B showing a state where a preliminary molded product is taken out from the first die.
Figure 4B:
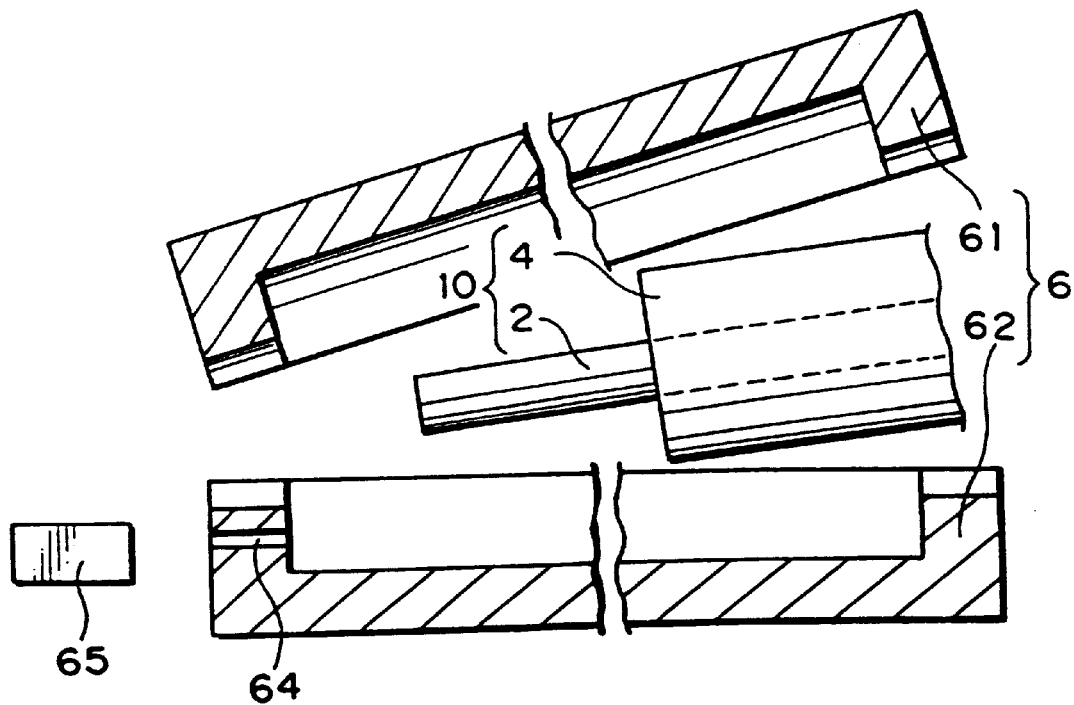
Figure 5A:
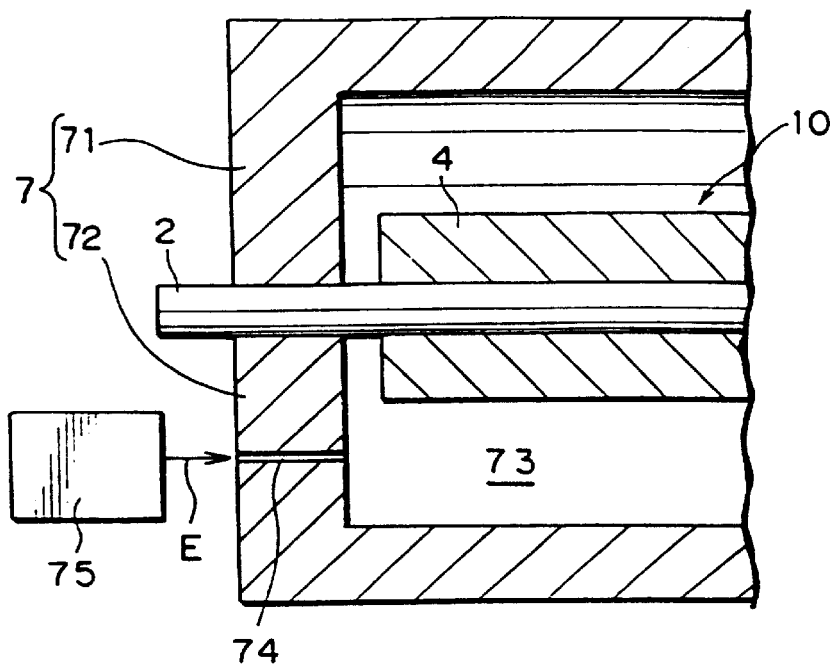
FIGS. 5A and 5B are diagrams showing a second step of the producing method, FIG. 5A showing a state where a molten elastomer is injected into a second die mounted with the preliminary molded product, FIG. 5B showing a state where a molded conveying roller is taken out from the second die.
Figure 5B:
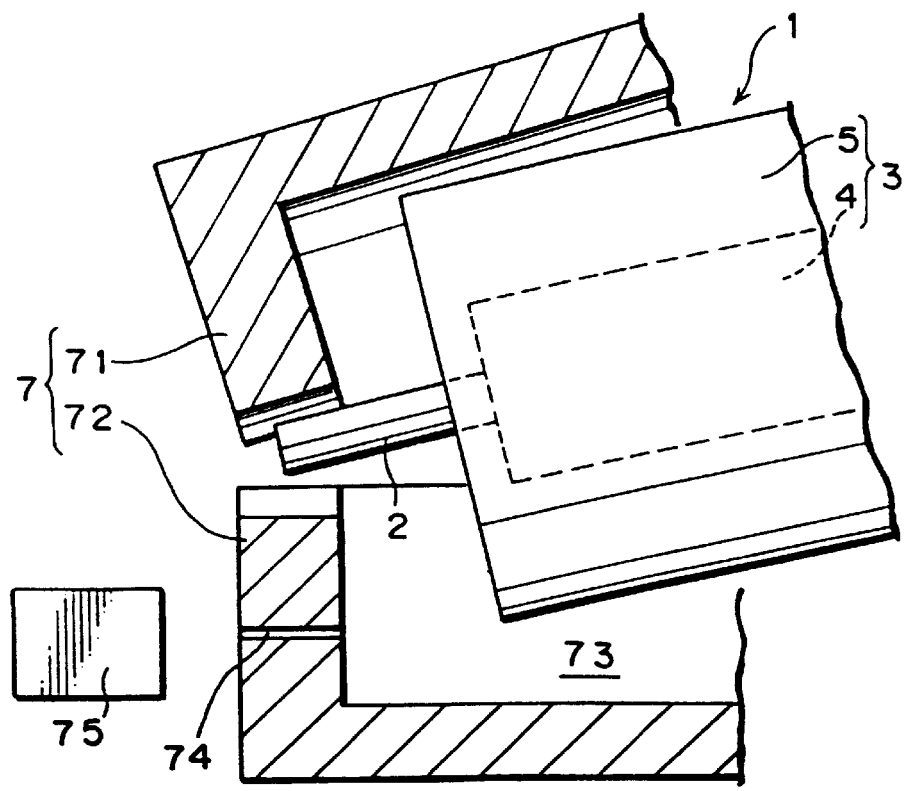

FIG. 4A shows a state where a molten resin P is injected into a first die 6 mounted with a shaft 2. FIG. 4B shows a state where a preliminary molded product is taken out from the first die 6. FIG. 5A shows a state where a molten elastomer E is injected into a second die 7 mounted with the preliminary molded product 10. FIG. 5B shows a state where a molded conveying roller 1 is taken out from the second die 7.

The first die 6 includes an upper mold member 61 and a lower mold member 62 as shown in FIG. 4A. A mold space 63 is formed by coupling the upper mold member 61 and the lower mold member 62 while a shaft 2 is held between them. The mold space 63 corresponds to a molded shape of the inner layer 4. An injection hole 64 is formed in an end wall of the lower mold member 62. The injection hole 64 extends in an axial direction of the shaft 2 to be placed in the mold space 63. Molten polypropylene P is supplied into the mold space 63 from an injecting machine 65 through the injection hole 64. In this embodiment, the polypropylene P is heated to 180 to 200° C. in the injecting machine 65.

The second die 7 includes an upper mold member 71 and a lower mold member 72 as shown in FIG. 5. A mold space 73 is formed by coupling the upper mold member 71 and the lower mold member 72 while the preliminary molded product 10 is held between them. The mold space 73 corresponds to a molded shape of the outer layer 5. An injection hole 74 is formed in an end wall of the lower mold member 72. The injection hole 74 extends in an axial direction of the shaft 2 to be placed in the mold space 73. Molten olefin elastomer E is supplied into the mold space 73 from an injecting machine 75 through the injection hole 74. In this embodiment, the olefin elastomer E is heated to 190 to 200° C. in the injecting machine 75.

The dies 6 and 7 each are provided with a cooler for cooling the upper mold and lower mold members. The dies 6 and 7 are cooled to 20 to 30° C. by the cooler.

The conveying roller 1 is produced as follows. First, as shown in FIG. 4A, the shaft 2 is held between the upper mold member 61 and lower mold member 62. Thereafter, a specified amount of molten polypropylene P is injected into the mold space 63 through the injection hole 64 from the injecting machine 65. Consequently, the mold space 73 is filled with molten polypropylene P, and the shaft 2 is covered with molten polypropylene P.

In this state, the polypropylene P is cooled to 20 to 30° C. by the cooler to produce a preliminary molded product 10 in which the shaft 2 is adhered to the inner layer 4. This preliminary molded product 10 is taken out from the mold space 63 by opening the upper mold member 61 as shown in FIG. 4B, and is transferred to a second step.

In the second step, as shown in FIG. 5A, the preliminary molded product 10 is held between the upper mold member 71 and the lower mold member 72. In this state, both end of the shaft 2 project out from the second die 7. A specified amount of molten olefin elastomer E is supplied into the mold space 73 from the injecting machine 75 through the injection hole 74. The preliminary molded product 10 in the mold space 73 is covered with the molten olefin elastomer E. In this state, the second die 7 is cooled to 20 to 30° C. by the cooler. Thereafter, the conveying roller 1 covered with the elastomer outer layer 4 is take out by opening the upper die 71, as shown in FIG. 5B.

The present invention is not limited to the foregoing embodiment. However, the following may be appreciated.

(1) In the foregoing embodiment, the inner layer 4 is formed into a cylindrical shape. However, the inner layer 4 may be formed into a shape having a triangular cross section, polygonal cross section, stellate cross section, etc.

(2) In the foregoing embodiment, polypropylene is used as material for the inner layer 4. However, it may be appreciated to use polystyrene, polyethylene, or the like in place of polypropylene. In the foregoing embodiment, as material for the outer layer 5, olefin elastomer is used. However, it may be appreciated to use styrene thermoplastic elastomer, polyamide elastomer, or the like in place of olefin elastomer.

(3) Alternatively, according to the present invention, it may be possible to use thermosetting elastomer, such as polyester elastomer, polyurethane elastomer, as material for the outer layer 5. In this case of using thermosetting elastomer, after injecting thermosetting elastomer into the second die 7 at a room temperature, the die 7 is heated to melt a surface portion of the inner layer 4 of thermoplastic resin and solidify the thermosetting elastomer.

(4) In the sixth modification, the shaft 2f has the intermediate portion having a square cross section. Further, it may be appreciated to use a shaft having an intermediate portion having a triangular cross section, a polygonal cross section, a stellate cross section, or the like.

(5) In the foregoing embodiment, the shaft 2 is made of metal. However, instead of metal, the shaft 2 may be made of resin or ceramics.

(6) In the foregoing embodiment, the molding material is supplied into the mold space 63 or 73 through the injection holes 64 or 74 in the axial direction to render the molecular orientation of the resin of the inner layer 3 or the elastomer of the outer layer 4 parallel to the shaft 2. This axial parallel orientation reduces the bending stress of the shaft. In the case of the length of shaft being as short as 300 mm or less, however, it may be appreciated to form an injection hole in a radial direction of the shaft 2.

As described above, a conveying roller is provided with a shaft and a body member placed on a periphery of the shaft. The body member includes an inner layer placed on the periphery of the shaft and an outer layer placed on a periphery of the inner layer. The inner layer is made of a thermoplastic resin having a predetermined volume reduction rate. The outer layer is made of an elastomer. In the conveying roller, the body member is constructed by the inner layer and the outer layer. The inner layer, which is in direct contact with the shaft, is made of thermoplastic resin having a predetermined volume reduction rate. Accordingly, the inner layer tightly grips the shaft, thus assuredly preventing the shaft from sliding with respect to the body member. The body member and the shaft can be integrated securely. The conveying efficiency is remarkably improved as compared with the conventional conveying rollers.

The conveying roller is produced by the method of injecting a molten thermoplastic resin having a predetermined volume reduction rate into a first mold space formed in a first die to place the molten thermoplastic resin around a periphery of a shaft held in the first die, cooling the first die to produce a preliminary molded product having an inner layer of thermoplastic resin on the periphery of the shaft, thereafter placing the preliminary molded product in a second die having a second mold space, and injecting a molten elastomer into the second mold space to place the molten elastomer around a periphery of the inner layer of the preliminary molded product, and cooling the second die to produce the conveying roller having an outer layer of elastomer on the periphery of the inner layer.

The method eliminates the application of adhesive on the periphery of a shaft, and also eliminates the insertion of a shaft in a body member, thus simplifying the production process. This makes it possible to greatly reduce the production costs.

As material which comes into direct contact with a shaft, thermoplastic resin having a predetermined volume reduction rate is used. The thermoplastic resin noticeably shrinks in the course of solidification, strongly gripping the shaft. Accordingly, this method produces a conveying roller having a great adhesion between the shaft and the body member.

The shaft is formed with recesses, grooves, holes, or other irregularity in the periphery of the shaft. The thermoplastic resin of the inner layer occupies the irregular gaps, consequently increasing the adhesion between the shaft and the inner layer. Shift between the shaft and the body member is thus reliably prevented.

The ends of the inner layer are covered with the outer layer of elastomer. The boundary between the inner layer and the outer layer is not exposed. This assures an increased life duration and an improved appearance for the conveying roller.

The outer layer is made of elastomer having a melting temperature substantially identical to that of the thermoplastic resin of the inner layer. Specifically, in the production process, a periphery surface of the inner layer of thermoplastic resin is heated and partially melted by the molten thermoplastic elastomer. Consequently, the thermoplastic resin of the inner layer and the elastomer of the outer layer mix with each other in a boundary between them.

Accordingly, the adhesion between the inner layer and the outer layer is enhanced.

As the thermoplastic resin for the inner layer, polypropylene, polystyrene, or polyethylene is used. These thermoplastic resins have a volume reduction rate as large as 0.5% to 2.0%. Accordingly, these thermoplastic resins are preferable for the inner layer.

As the elastomer for the outer layer is used thermoplastic elastomer such as olefin elastomer, styrene elastomer, or polyamide elastomer, or thermosetting elastomer such as polyester elastomer or polyurethane elastomer. These elastomers have a melting temperature substantially identical to that of polypropylene, polystyrene, or polyethylene for the inner layer, thereby ensuring an increased mixing with the thermoplastic resin of the inner layer. Thus, the adhesion between the inner layer and the outer layer is increased.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A conveying roller comprising:
   a shaft;
   a body member molded on a periphery of the shaft, the body member including:
   an inner layer molded on the periphery of the shaft, the inner layer being made of a thermoplastic resin having a volume reduction rate in a range of 0.5 to 2.0 percent; and
   an outer layer molded on a periphery of the inner layer, the outer layer being made of an elastomer.

2. A conveying roller according to claim 1, wherein the thermoplastic resin is a resin selected from the group consisting of polypropylene, polystyrene, and polyethylene.

3. A conveying roller comprising:
   a shaft;
   a body member on a periphery of the shaft, the body member including:
   an inner layer molded on the periphery of the shaft, the inner layer being made of a thermoplastic resin having a volume reduction rate in a range of 0.5 to 2.0%; and
   an outer layer molded on a periphery of the inner layer, the outer layer being made of an elastomer; and
   wherein a melting temperature of the inner layer is substantially the same as one of a melting temperature and a setting temperature of the outer layer and the outer layer is molded onto the inner layer such that an outer peripheral layer of the inner layer is melted by and mixes with an inner peripheral layer of the elastomer of the outer layer to form a mixed boundary region of the inner layer and the outer layer.

4. A conveying roller according to claim 3, wherein the inner layer has axial ends and the axial ends of the inner layer are covered by the outer layer.

5. A conveying roller according to claim 3, wherein the shaft is formed with a recess in the periphery thereof.

6. A conveying roller according to claim 3, wherein the shaft is formed with a groove in the periphery thereof.

7. A conveying roller according to claim 3, wherein the shaft is formed with a hole in the periphery thereof.

8. A conveying roller according to claim 3, wherein the thermoplastic resin is a resin selected from the group consisting of polypropylene, polystyrene, and polyethylene.

9. A conveying roller according to claim 8, wherein the elastomer is a thermoplastic elastomer.

10. A conveying roller according to claim 9, wherein the thermoplastic elastomer is an elastomer selected from the group consisting of olefin elastomer, styrene elastomer, and polyamide elastomer.

11. A conveying roller according to claim 8, wherein the elastomer of the outer layer is a thermosetting elastomer.

12. A conveying roller according to claim 11, wherein the thermosetting elastomer is an elastomer selected from the group consisting of polyester elastomer and polyurethane elastomer.

13. A conveying roller according to claim 3, wherein the elastomer of the outer layer is a thermosetting elastomer.

14. A conveying roller according to claim 13, wherein the thermosetting elastomer is an elastomer selected from the group consisting of polyester elastomer and polyurethane elastomer.

15. A conveying roller according to claim 3, wherein the elastomer is a thermoplastic elastomer.

16. A conveying roller according to claim 15, wherein the thermoplastic elastomer selected from the group consisting of olefin elastomer, styrene elastomer, and polyamide elastomer.

17. A conveying roller comprising:
    a shaft;
    a body member molded on a periphery of the shaft, the body member including:
    an inner layer molded on the periphery of the shaft, the inner layer being made of a thermoplastic resin; and
    an outer layer molded on a periphery of the inner layer, the outer layer being made of a thermoplastic elastomer having a melting temperature substantially the same as a melting temperature of the thermoplastic resin of the inner layer and the outer layer being molded onto the inner layer such that an outer peripheral layer of the inner layer is melted by and mixes with an inner peripheral layer of the elastomer of the outer layer to form a mixed boundary region of the inner layer and the outer layer.

18. A conveying roller according to claim 17, wherein the thermoplastic elastomer is an elastomer selected from the group consisting of olefin elastomer, styrene elastomer, and polyamide elastomer.

19. A conveying roller comprising:
    a shaft;
    a body member molded on a periphery of the shaft, the body member including:
    an inner layer molded on the periphery of the shaft, the inner layer being made of a thermoplastic resin; and
    an outer layer molded on a periphery of the inner layer, the outer layer being made of a thermosetting elastomer having a setting temperature substantially the same as a melting temperature of the thermoplastic resin of the inner layer and the outer layer being molded onto the inner layer such that an outer peripheral layer of the inner layer is melted by and mixes with an inner peripheral layer of the elastomer of the outer layer to form a mixed boundary region of the inner layer and the outer layer.

20. A conveying roller according to claim 19, wherein the thermosetting elastomer is an elastomer selected from the group consisting of polyester elastomer and polyurethane elastomer.

21. A conveying roller according to claim 20, wherein the thermoplastic resin is a resin selected from the group consisting of polypropylene, polystyrene, and polyethylene.

22. A conveying roller according to claim 19, wherein the thermoplastic resin is a resin selected from the group consisting of polypropylene, polystyrene, and polyethylene.

* * * * *